(12) United States Patent
Van Gorkom et al.

(10) Patent No.: US 8,277,106 B2
(45) Date of Patent: Oct. 2, 2012

(54) LIGHTING DEVICE

(75) Inventors: Ramon Pascal Van Gorkom, Eindhoven (NL); Lingli Wang, Bad Kreuznach (DE); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 369 days.

(21) Appl. No.: 12/682,350

(22) PCT Filed: May 8, 2008

(86) PCT No.: PCT/IB2008/051804
§ 371 (c)(1),
(2), (4) Date: Apr. 9, 2010

(87) PCT Pub. No.: WO2008/139383
PCT Pub. Date: Nov. 20, 2008

(65) Prior Publication Data
US 2010/0246158 A1    Sep. 30, 2010

(30) Foreign Application Priority Data
May 10, 2007 (EP) .................................... 07107933

(51) Int. Cl.
*F21V 7/04* (2006.01)
(52) U.S. Cl. .......... 362/616; 362/19; 362/552; 362/608; 385/901

(58) Field of Classification Search ............... 362/19, 362/26, 608–610, 616, 551, 552; 385/131, 385/901
See application file for complete search history.

(56) References Cited

U.S. PATENT DOCUMENTS

| | | | |
|---|---|---|---|
| 7,033,034 B2 * | 4/2006 | Oh | 362/616 |
| 7,066,634 B2 * | 6/2006 | Kitamura et al. | 362/616 |
| 2001/0002164 A1 | 5/2001 | Ludwing et al. | |
| 2005/0024844 A1 | 2/2005 | Oh | |
| 2005/0174802 A1 | 8/2005 | Wu et al. | |
| 2006/0121961 A1 | 6/2006 | Cho | |

FOREIGN PATENT DOCUMENTS

| | | |
|---|---|---|
| WO | 2006043196 A1 | 4/2006 |
| WO | 2007034397 A2 | 3/2007 |

* cited by examiner

*Primary Examiner* — Stephen F Husar
(74) *Attorney, Agent, or Firm* — Mark L. Beloborodov

(57) ABSTRACT

The present invention provides a lighting device, comprising a first light guide adapted to guide light and output the light in a first direction; a second light guide adapted to guide light and output the light in another, second direction; a dividing structure adapted to receive light from a light source and guide the light into the first light guide and into the second light guide, wherein the dividing structure comprises controllable dividing means for guiding a first percentage of the light from the light source into the first light guide, and a second percentage of the light from the light source into the second light guide.

13 Claims, 10 Drawing Sheets

LIGHTING DEVICE

FIELD OF THE INVENTION

The present invention relates to a lighting device to provide adjustable lighting.

BACKGROUND OF THE INVENTION

The following provides a general introduction, and includes an extract from Wikipedia. Please see http://en.wikipedia.org/wiki/Lighting#Fixtures.

Lighting fixtures come in a wide variety of styles for various functions. Some are very plain and functional, while others are pieces of art in themselves. Nearly any material can be used, so long as it can tolerate the heat and is in keeping with safety codes.

Lighting types are classified by intended use as general, localized, or task lighting, depending largely on the distribution of the light produced by the fixture.

General lighting fills in between the two and is intended for general illumination of an area. Indoors, this would be a basic lamp on a table or floor, or a fixture on the ceiling. Outdoors, general lighting for a parking lot may be as low as 10-20 lux (1-2 foot-candles) since pedestrians and motorists already used to the dark will need little light for crossing the area.

Task lighting is mainly functional and is usually the most concentrated, for purposes such as reading or inspection of materials. For example, reading poor-quality reproductions may require task lighting levels up to 1500 lux (150 foot-candles), and some inspection tasks or surgical procedures require even higher levels.

Task lighting may include a glare norm. Glare herein indicates over-illumination. A first type of glare occurs when light that is reflected on furniture is too bright. This first type of over-illumination may occur indoors when light levels exceed for instance 500 lux for incidental lighting, exceed 800 lux for general office use or exceed 1,500 lux for special purpose use. Note, the midday sun provides about 32,000 to 100,000 lux depending on latitude, time of year and cloud cover. Another type of glare involves direct lighting. To prevent this second type of over-illumination indoors, brightness may for instance be limited to 1000 Cd/m2 outside an angle of about 60 degrees with respect to a normal (perpendicular) line. Full-width half-maximum is defined as the divergence angle at half of the maximum light output intensity of a luminaire.

Localized lighting is mainly decorative, intended to highlight pictures, plants, or other elements of interior design or landscaping.

Methods to achieve the above lighting types include uplighting, downlighting, frontlighting and backlighting.

Downlighting is most common, with fixtures on or recessed in the ceiling casting light downward. This tends to be the most used method, used in both offices and homes. Although it is easy to design it may cause problems with glare and excess energy consumption due to a large number of fittings.

Uplighting is often used to bounce indirect light off of the ceiling and back down. It is commonly used in lighting applications that require minimal glare and uniform general illuminance levels. Uplighting (indirect) uses a diffuse surface to reflect light in a space and can minimize disabling glare on computer displays and other dark glossy surfaces. It gives a more uniform presentation of the light output in operation.

Frontlighting is also quite common, but tends to make the subject look flat as its casts almost no visible shadows. Lighting from the side is the less common, as it tends to produce glare near eye level. Backlighting either around or through an object is mainly for accent.

Lighting design as it applies to the built environment, also known as 'architectural lighting design', is both a science and an art. Comprehensive lighting design requires consideration of the amount of functional light provided, the energy consumed, as well as the aesthetic impact supplied by the lighting system. Some buildings, like surgical centers and sports facilities, are primarily concerned with providing the appropriate amount of light for the associated task. Some buildings, like warehouses and office buildings, are primarily concerned with saving money through the energy efficiency of the lighting system. Other buildings, like casinos and theatres, are primarily concerned with enhancing the appearance and emotional impact of architecture through lighting systems. Therefore, it is important that the sciences of light production and luminaire photometrics are balanced with the artistic application of light as a medium in our built environment. These electrical lighting systems should also consider the impacts of, and ideally be integrated with, daylighting systems.

As indicated above, some lamps provide task light, such as overhead TL luminaires. Other lamps provide general light, for instance a chandelier. As providing two different lamps for the two different lighting types is expensive, it would be advantageous if both light types could be combined in a single luminaire.

WO-2006/043196-A1 provides a device for electrically controlling shaping of a light beam. The device includes primary optics to shape a light beam from a light source. Adjacent to the primary optics, the device includes an electrically controlled scattering element. The scattering element may comprise polymer dispersed liquid crystals (PDLC) or liquid crystal (LC) gels. Secondary optics are provided adjacent to the scattering element to shape the scattered, diffracted or refracted light beam coming from the scattering element. However, the control of the light beam is limited to influencing the full-width half-maximum divergence angle.

OBJECT OF THE INVENTION

The present invention aims to provide an improved luminaire and a method to provide task light and general light.

SUMMARY OF THE INVENTION

The present invention provides a lighting device, comprising:
 a first light guide adapted to guide light and output the light in a first direction;
 a second light guide adapted to guide light and output the light in another, second direction;
 a dividing structure adapted to receive light from a light source and guide the light into the first light guide and into the second light guide, said dividing structure comprising:
  controllable dividing means for guiding a first percentage of the light from the light source into the first light guide, and a second percentage of the light from the light source into the second light guide.

Light output in the first direction may provide general lighting, and light output in the second direction may provide task lighting. The lighting device may provide general light as well as task light, even at the same time, and combines the function of two separate luminaires in one. Besides being efficient and taking up less room, combining the two functions reduces costs.

In an embodiment, the first direction is adapted to provide uplighting and the second direction is adapted to provide downlighting. This embodiment is advantageous for lighting articles on display, such as in shops, or for lighting desks in offices.

In another embodiment, the lighting device comprises a reflecting surface for reflecting the light output in the first direction. The reflected light will be scattered, thus providing a generally warmer light that is suitable for atmospheric lighting.

The first and/or second light guides may include flat panel light guides, or a stack of flat panel light guides. These prove efficient for guiding and distributing light from an LED light source.

The dividing means may comprise a first stack for allowing the first percentage of light to pass into the first light guide; a second stack for allowing the second percentage of light to pass into the second light guide; the first stack and/or the second stack comprising: a first reflective polarizing layer; a control layer; and a second reflective polarizing layer. The control layer enables accurate control of the first and/or second percentage within a range of 0 to 100%.

In another embodiment, the dividing means comprise a slidable mirror assembly, comprising one or more mirrors for reflecting incident light; and one or more openings for allowing incident light to pass. The slidable mirror assembly also allows control of the first and/or second percentage within a range of 0 to 100%. Besides, the mirror assembly is simple, robust and cost efficient. The mirrors may comprise color filters, such as dichroic mirrors or filters.

DETAILED DESCRIPTION OF EXAMPLES

Figure 1:
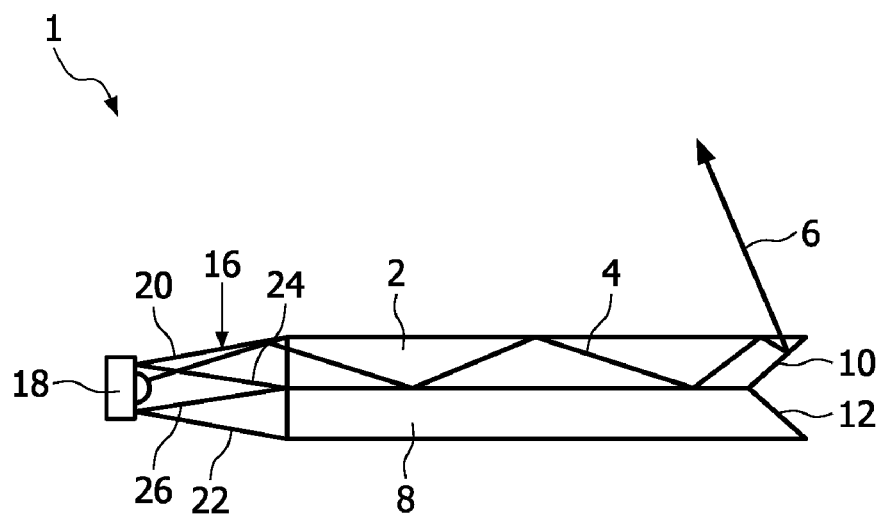
FIG. 1 shows a side view of an embodiment of the lighting device of the present invention.
Figure 2:
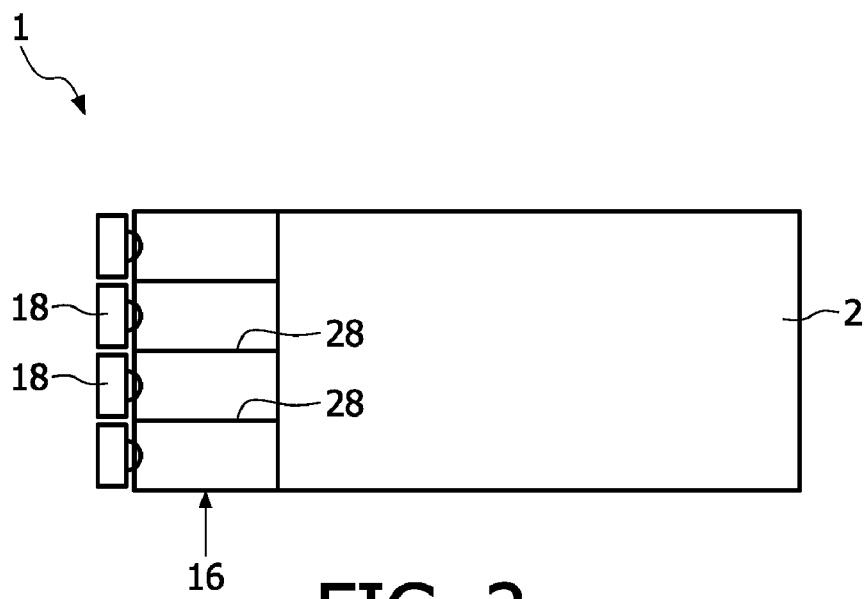
FIG. 2 shows a plan view of the lighting device of FIG. 1.

FIGS. 1 and 2 show a lighting device 1 according to the present invention, comprising a first light guide 2 adapted to guide and internally reflect light 4 and output the light in a first direction 6. The device 1 comprises a second light guide 8 adapted to guide and internally reflect light and output the light in another, second direction. The first light guide and the second light guide are flat panel light guides, comprising at one end a reflecting surface 10, 12 for determining the first direction and the second direction, respectively. The first and second light guide are adjacent and parallel to each other.

At the opposite end, the first and second light guide are coupled to a dividing structure 16 that is adapted to receive light from a light source 18 and guide a first percentage of the light into the first light guide 2 and a second percentage of the light into the second light guide 8. The dividing structure comprises a tapered body having reflective walls 20, 22 for containing the light. Within the body, the light dividing structure comprises controllable dividing elements 24, 26 for allowing a first percentage of the light from the light source 18 to pass into the first light guide, and a second percentage of the light from the light source into the second light guide.

The lighting device comprises a controller (not shown) that is coupled to the dividing elements for controlling the first and the second percentage of light passing into the first and second light guide.

The light source 18 preferably comprises a light emitting diode (LED). The device 1 may comprise one, or more than one, LED. FIG. 2 shows reflecting partitions 28 between the LEDs. The reflective partitions 28 enable dividing of the light coming from separate LEDs. For instance, one of the four LEDs 18 shown in FIG. 2 may provide white light, and another LED may provide green, red and/or blue light, respectively. The dividing elements shown in FIG. 2 may switch colors separately. For instance, all the red light may be directed in the first direction, i.e. upwards in FIG. 1, whereas all the green light is directed in the second direction, i.e. downwards.

Figure 3:
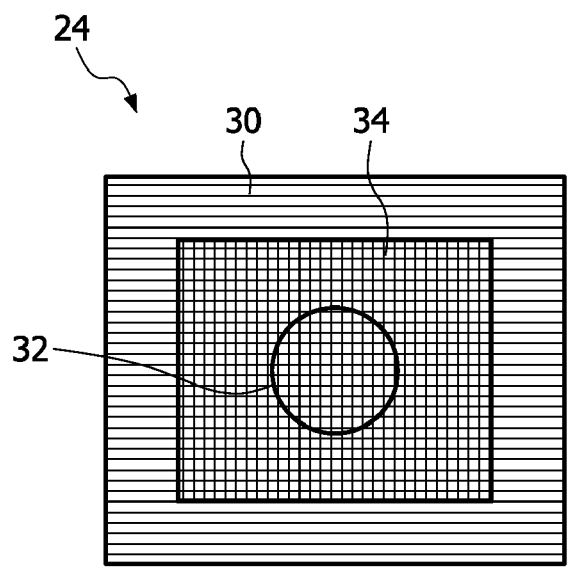
FIG. 3 shows a schematic plan view of an embodiment of dividing means according to the present invention.
Figure 4:
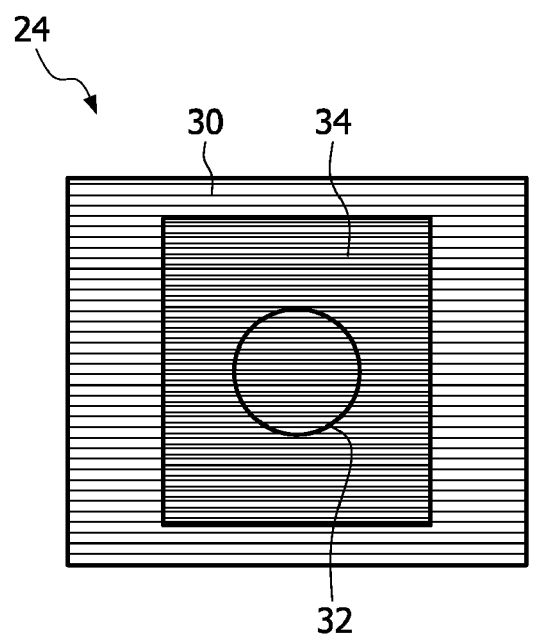
FIG. 4 shows a schematic plan view of another embodiment of dividing means according to the present invention.
Figure 6:
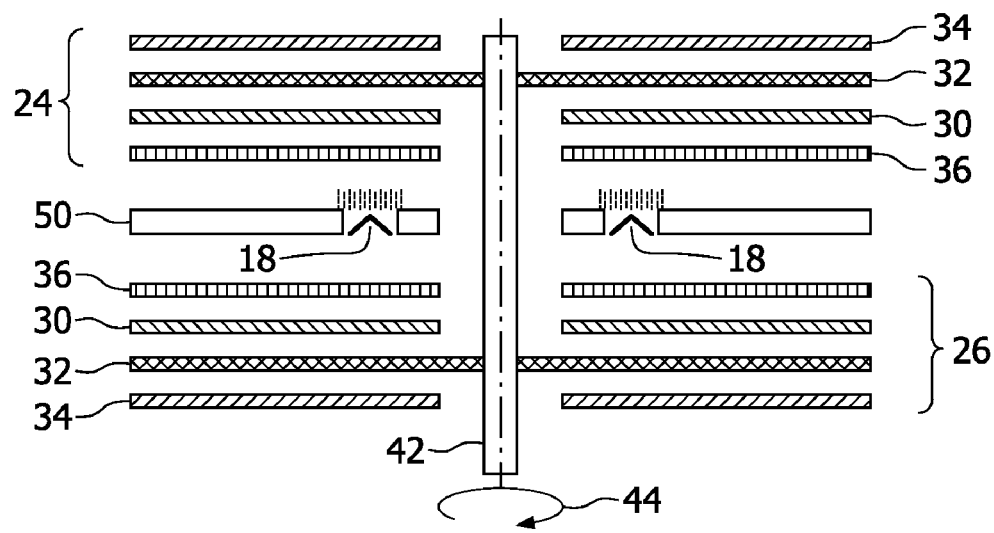
FIG. 6 shows a side view of the dividing structure of FIG. 5.

As shown in FIGS. 3, 4 and 6, the dividing elements 24, 26 may comprise a stack including a first reflective polarizing layer (DBEF) 30, a control layer 32, and a second reflective polarizing layer (DBEF) 34. The control layer is arranged in between the first and second DBEF layer.

DBEF is a reflective polarizer, i.e. the material reflects light from one polarization direction, and is transparent for light from the other, perpendicular polarization direction.

The control layer may include a liquid crystal (LC) layer. The LC layer comprises LC molecules that can switch the polarization direction of light passing through the LC layer under the influence of an electric field. The orientation of the LC molecules can be adjusted by applying such electric field over the LC layer, for instance by applying suitable voltages to electrodes that are connected to, or are arranged in close proximity to, the LC layer 32. By controlling the electric field, the LC layer may provide either a full switch (i.e. all the polarized light passes or is reflected), or a partial switch (i.e. some of the polarized light passes, enabling the first and/or the second percentage to be any percentage between 0 and 50%).

Optionally, as shown in FIG. 6, the stack of the switchable element 24 and/or 26 includes a retarding layer 36 to convert the light passing through it from one polarization direction to another, perpendicular polarization direction. In an embodiment, only the switchable element 24 comprises the retarding layer. The retarding layer is arranged on the side of the stack 24 and/or 26 facing the light source 18 (FIG. 6).

The retarding layer comprises for instance a ¼-lambda layer included in one of the stacks 24 or 26, a ½-lambda layer, or a ⅛-lambda layer included in both stacks 24 and 26 (FIG. 6). The retarding layers are preferably optimized for the angle of incidence of the light.

The orientation of the DBEF layers 30 of the dividing elements 24, 26 is preferably the same. The orientation of the DBEF layers 34 depends on the type of the LC layer 32. Typically, the DBEF layer 34 has an orientation that is rotated about 90 degrees relative to the orientation of the DBEF layer 30, as shown in FIG. 3. In another embodiment, both layers 30 and 34 have the same orientation, as shown in FIG. 4.

If a ¼-lambda layer 36 is included, an axis thereof is preferably arranged at a 45 degree angle relative to the polarization axis of the first DBEF layer 30.

The dividing element of FIGS. 3, 4 has the advantage that the light passing the stack shown in FIGS. 3 and 4 is polarized. Also, the brightness of the passing light is substantially maintained.

In a practical embodiment, the thickness of the light guides 2, 8 is at least comparable to the outer dimensions of the lamp 18. If the dividing means 24, 26 comprise the stack of FIGS. 3, 4, the thickness of the light guides is preferably at least twice the outer dimensions of the lamp 18. If the lamp 18 comprises an LED, exemplary outer dimensions include diameters of about 3 mm to about 10 mm.

Figure 5:
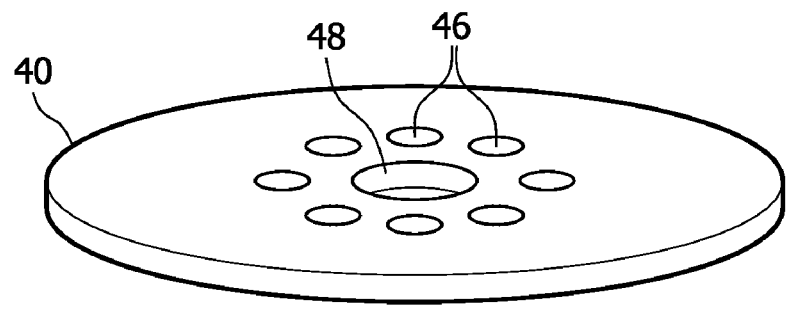
FIG. 5 shows a perspective view of an embodiment of a dividing structure comprising the dividing means of FIG. 3.

FIGS. 5 and 6 show a mechanically controllable embodiment to use the stacks of FIG. 3 and/or 4. The stacks 24, 26 are arranged within housing 40 (FIG. 5). The housing 40 comprises openings 46 for the passage of light. The housing comprises a central opening 48 to receive axis 42. The first DBEF layers 30, the second DBEF layer 34 and two ⅛-lambda layers 36 are fixated within the housing 40 (FIG. 6). Light sources 18 are arranged on a carrier 50 that is fixated within the housing 40. ½-lambda layers 32 are connected to a rotatable axis 42, for instance in the direction of arrow 44.

By rotating the axis 42 including the ½-lambda layers 32, the percentage of light that the dividing elements 24, 26 allow to pass will change. For instance, initially light from the light sources 18 may pass through stack 24 (i.e. upwards in FIG. 6), but stack 26 will partially or entirely reflect incident light. Upon turning the plates 32 in the direction of the arrow 44, subsequently both stacks 24 and 26 will allow light from light sources 18 to pass. Upon continued rotation of the layers 32, all incident light may pass stack 26, but stack 24 will partially or entirely reflect incident light. Please note that a DBEF/LC/DBEF stack will reflect incident light in a range of 50% to 100% depending on the state of the LC layer, as light in one of two polarization directions will always be reflected. However, the additional retarding layer, for instance the ⅛ lambda layer or the ½ lambda layer, will change the polarization direction of the reflected light. Thus if the light returns to the DBEF/LC/DBEF stack, it will travel in the other polarization direction. Therefore, this arrangement will still allow passage of 100% of the light when the LC layers are in the correct state.

In another embodiment, the dividing elements 24, 26 include an LC gel and/or a polymer dispersed liquid crystal (PDLC) layer. The gel or the layer can switch between a transparent state and a scattering state upon application of an electric field. If the layer is thick enough it will scatter all the incident light when the layer is in the scattering state. Thus, the element can either allow incident light to pass, or block and partially reflect the light.

Figure 7:
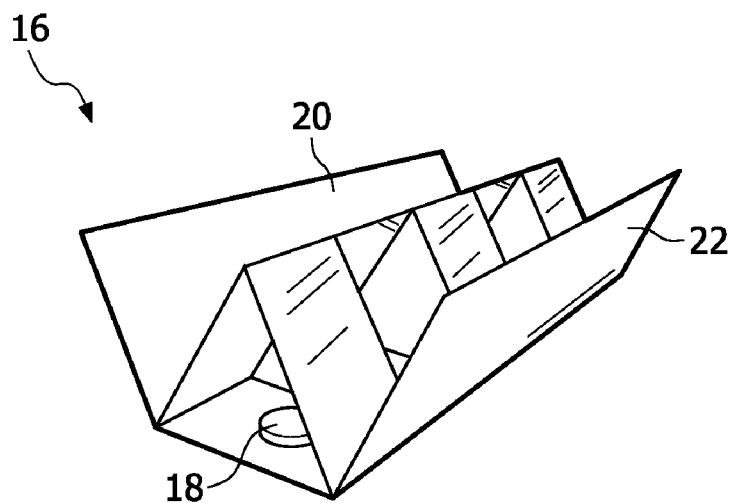
FIG. 7 shows a perspective view of another embodiment of a dividing structure according to the invention.
Figure 8:
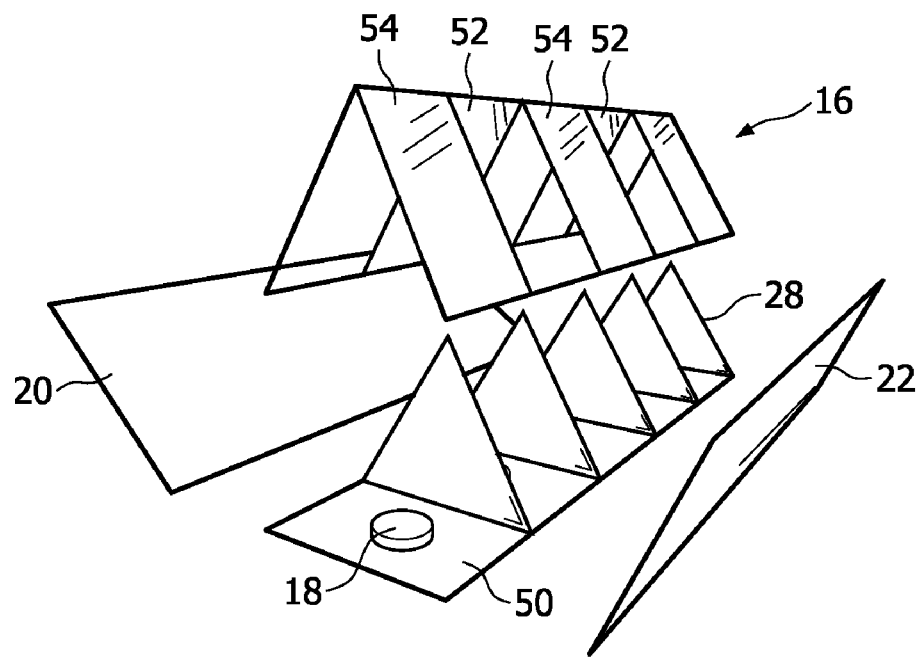
FIG. 8 shows an exploded view of the dividing structure of FIG. 7.

In the embodiment shown in FIGS. 7 and 8, dividing structure 16 includes reflecting walls 20, 22. As an example, the walls 20, 22 are arranged at an angle relative to each other that is suitable for the embodiment of the lighting device 1 of FIG. 1. Light sources 18 are arranged on carrier 50. Adjacent light sources are separated by reflecting partitions 28. The partitions 28 are for instance triangular. In an embodiment, the dividing elements 24, 26 comprise mirrors 52, 54 respectively. The mirrors 52, 54 are arranged slidably relative to the partitions 28. The mirrors are arranged at an angle relative to each other to correspond to the perimeter of the partitions 28. In other embodiments, the elements 52, 54 comprise color filters, including color absorbing filters and/or dichroic mirrors or filters.

When included in the lighting device of the present invention, the dividing structure shown in FIGS. 7, 8 allows control of the first percentage of light in the first direction and the second percentage of light in the second direction by mechanically moving the mirrors 52, 54 relative to the partitions 28, in the direction of the length of the walls 20, 22. The first percentage may be any percentage between 0 and 100%. The second percentage will be 100% minus the first percentage.

Figure 9:
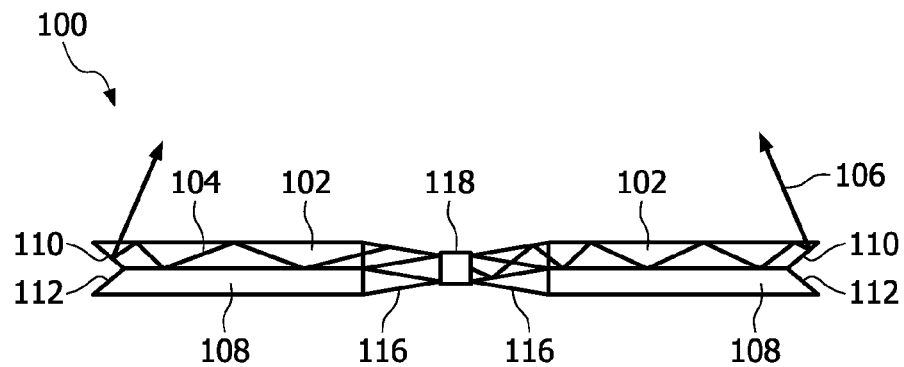
FIG. 9 shows a side view of another embodiment of the lighting device of the present invention.
Figure 10:
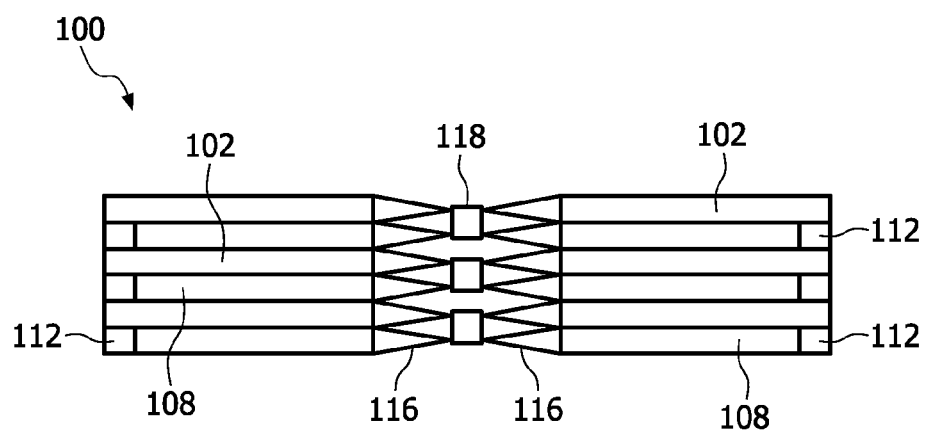
FIG. 10 shows a plan view of the lighting device of FIG. 9.
Figure 11:
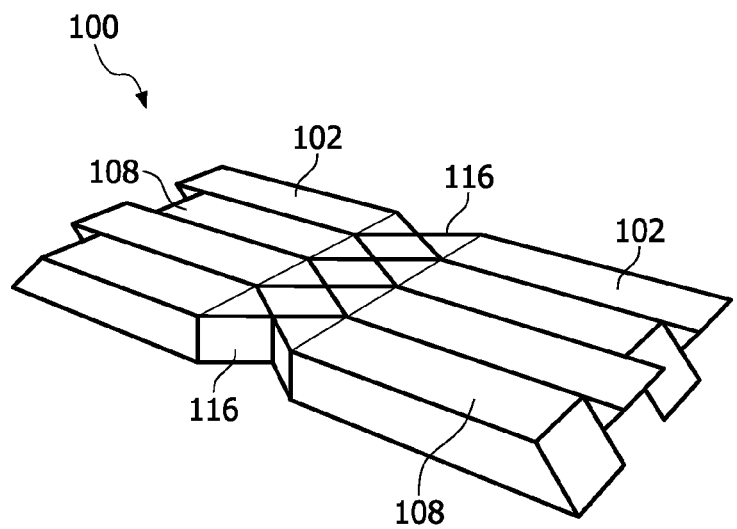
FIG. 11 shows a perspective view of the lighting device of FIG. 9.

The lighting device 100 (FIGS. 9-11) includes light sources 118. The light sources 118 comprise LEDs that emit light towards their side. That is to say, the light source 118 is arranged perpendicularly with respect to the light source 18 as shown in FIG. 1. The lighting device includes first light guides 102 and second light guides 108 comprising reflective surfaces 110, 112, respectively, at one end. At the opposite end, the light guides 102, 108 are coupled to dividing structure 116. As shown in FIG. 9, the first light guides 102 internally reflect light in the direction of the reflective surface 110. The reflective surface 110 reflects incident light in a first direction 106. The light guides 102, 108 and the dividing structure 116 substantially correspond to the light guides 2, 8 and the dividing structure 16 of the lighting device 1 (FIG. 1).

The lighting device 200 (FIGS. 12-14) comprises side emitting LEDs 218 that are arranged for emitting light into dividing structure 216. Dividing structure 216 includes switchable elements 224, 226. The light sources 218 are separated by reflecting partitions 228.

The lighting device 200 comprises first light guide 202 adapted to guide and internally reflect light 204 and output the light in a first direction 206. The device 200 comprises a second light guide 208 adapted to guide and internally reflect light 205 and output the light in another, second direction 207. The first light guide and the second light guide are flat panel light guides, having ends 210, 212 respectively. The first and second light guide are aligned to each other.

At their opposite ends, the first and second light guides are coupled to a dividing structure 216 comprising controllable dividing elements 224, 226 for allowing a first percentage of the light from the light source 218 to pass into the first light guide 202, and a second percentage of the light from the light source 218 into the second light guide 208.

Figure 12:
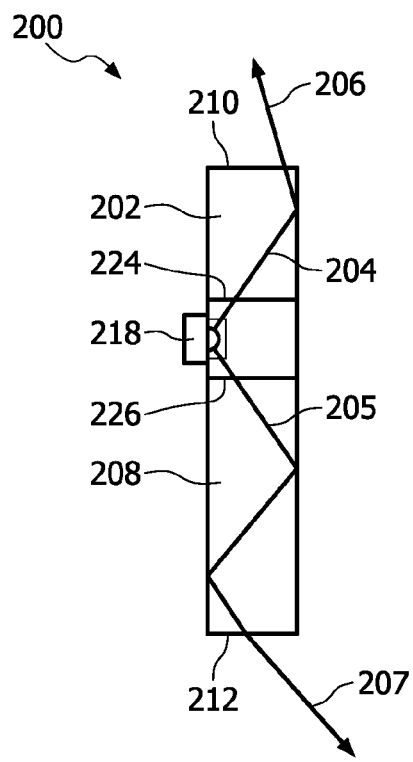
FIG. 12 shows a side view of another embodiment of the lighting device of the present invention in a first state.

The dividing elements 224, 226 may include any of the dividing elements shown in FIGS. 3 to 8. If the dividing elements 224, 226 include PDLC or an LC gel, the dividing elements may comprise a collimator to collimate the light passing the dividing element. Any percentage of the light from the light sources 218 may be directed into the first light guide and into the second light guide. Light 205 may be directed downward and exit in a first direction 207. Light 204 may be directed upward and exit in a second direction 206 (FIG. 12). The switchable elements 224 may be controlled to reflect all incident light 204 into the second light guide 208. The light 204 will then exit in the direction of arrow 209.

Figure 15:
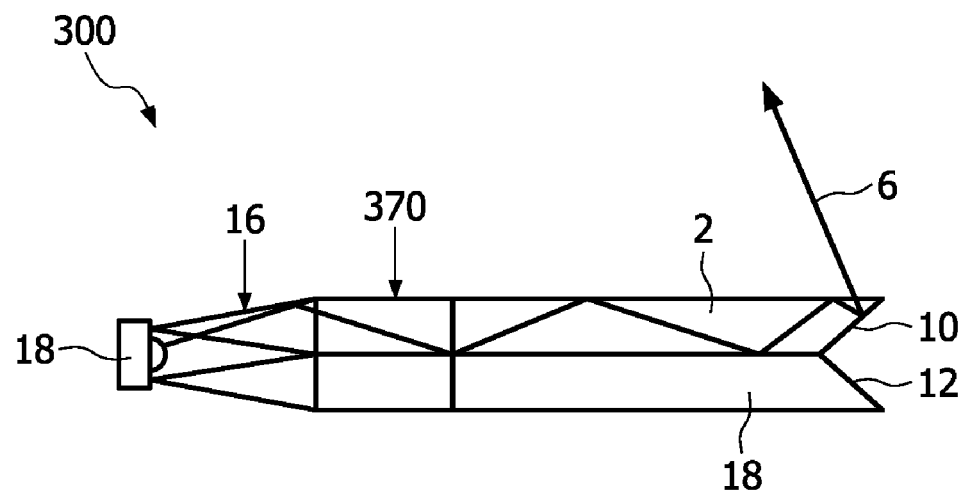
FIG. 15 shows a side view of another embodiment of the lighting device of the present invention.
Figure 16:
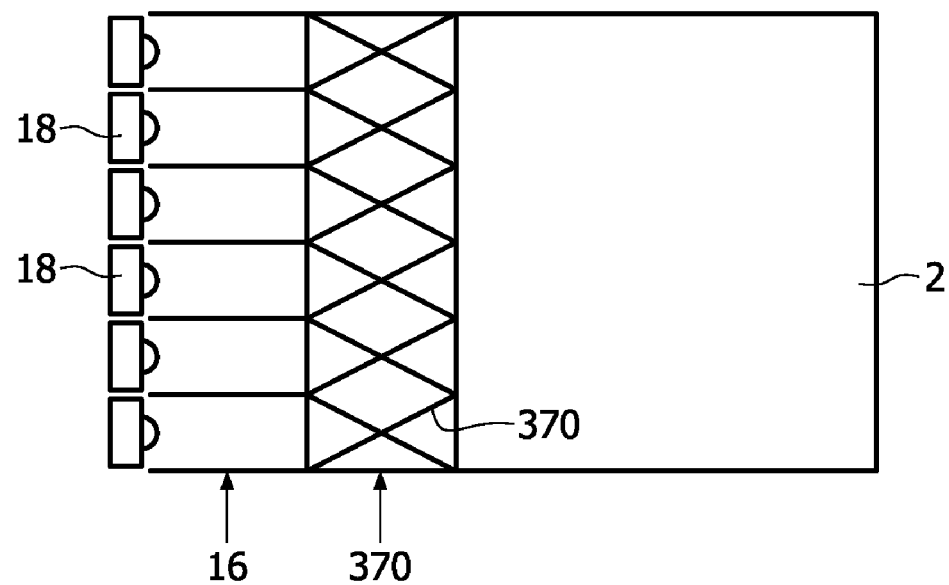
FIG. 16 shows a plan view of the lighting device of FIG. 15.

The lighting device 300 (FIGS. 15, 16) mainly corresponds to the lighting device 1 of FIG. 1. The device 300 includes dichroic structure 370. The dichroic structure is arranged between the first and second light guides 2, 8 and the dividing structure 16. The dichroic structure comprises for instance dichroic mirrors and/or filters that are adapted to reflect one color of light, i.e. a predetermined wavelength range, and to be transparent for other colors, i.e. wavelengths.

The dichroic structure 370 is arranged to mix the different colors of light, i.e. to mix light having different wavelengths. This improves the appearance of the light output of the luminaire 300. The dichroic structure 370 therefore includes for instance mirrors and/or filters 372, 374. The dichroic mirrors 372, 374 are arranged at a predetermined angle relative to each other. The predetermined angle is preferably in the range of 10 to 60 degrees, more preferably about 20 degrees.

In practice, the mirrors and/or filters 372, 374 are provided with optical coatings, which are designed to reflect light over a certain range of wavelengths, and transmit light which is outside that range. The dichroic mirror comprises for instance a transparent substrate and a dielectric multilayer structure formed thereon. The dielectric multilayer structure includes for instance layers having a relatively high refractive index and layers having a relatively low refractive index formed alternately. Each layer has an optical thickness of about ¼-lambda, where lambda is the predetermined central wavelength.

Figure 17:
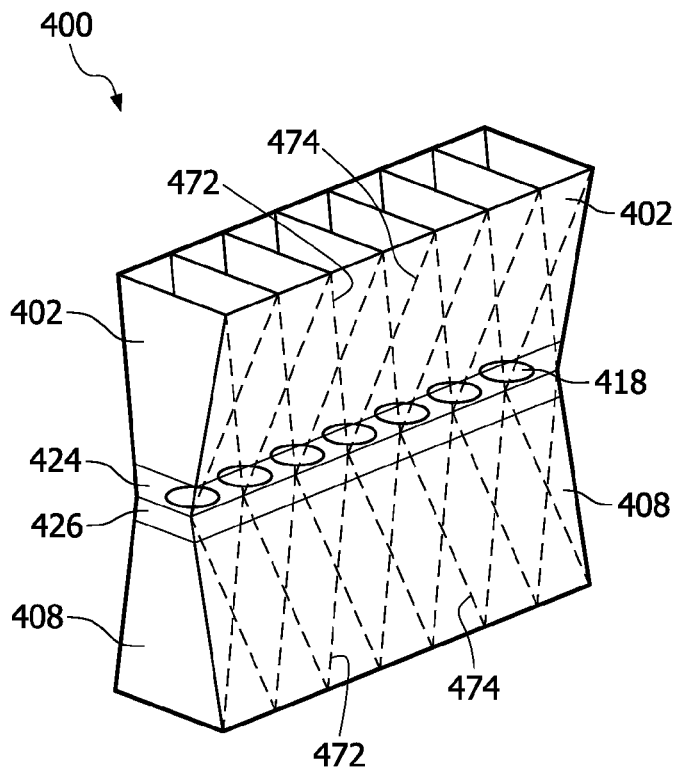
FIG. 17 shows a perspective view of another embodiment of the lighting device of the present invention.
Figure 18:
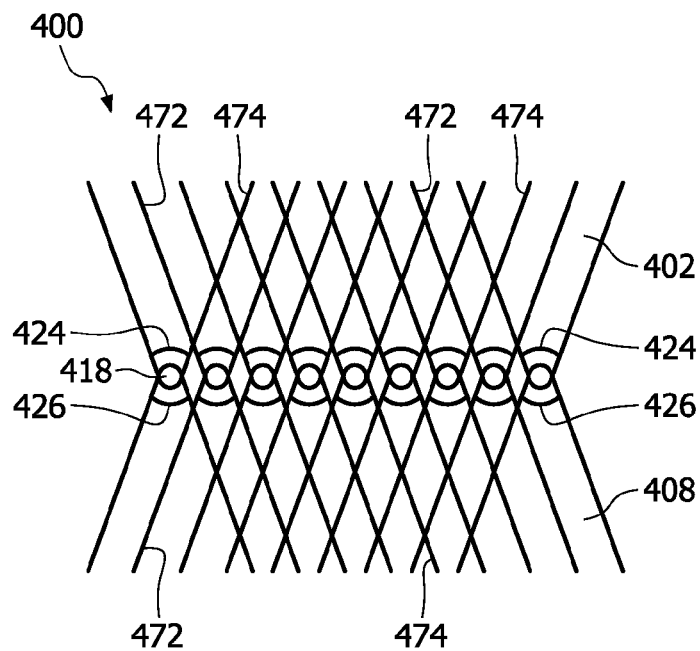
FIG. 18 shows a diagram in plan view of an embodiment of the lighting device of FIG. 17.
Figure 19:
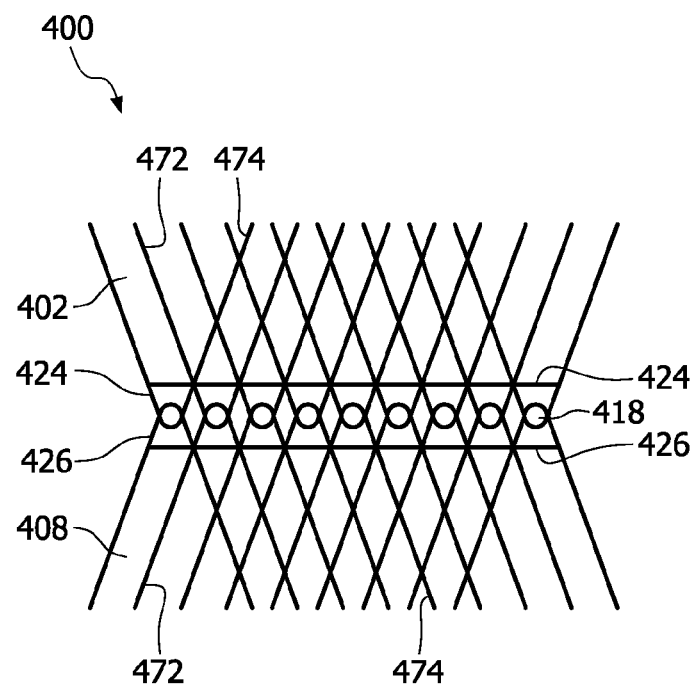
FIG. 19 shows a diagram in plan view of another embodiment of the lighting device of FIG. 17.

FIGS. 17-19 show embodiments of lighting device 400 including first light guides 402 and second light guides 408, comprising a dichroic structure. The first and second light guides are slightly wedge-shaped, for guiding light from light sources 418. The light guides comprise dividing elements 424, 426. Within the first and/or second light guides, dichroic mirrors 472, 474 are provided.

The dichroic structure preferably collimates the light and/or improves the brightness of the light that is output from the luminaire 400.

Figure 20:
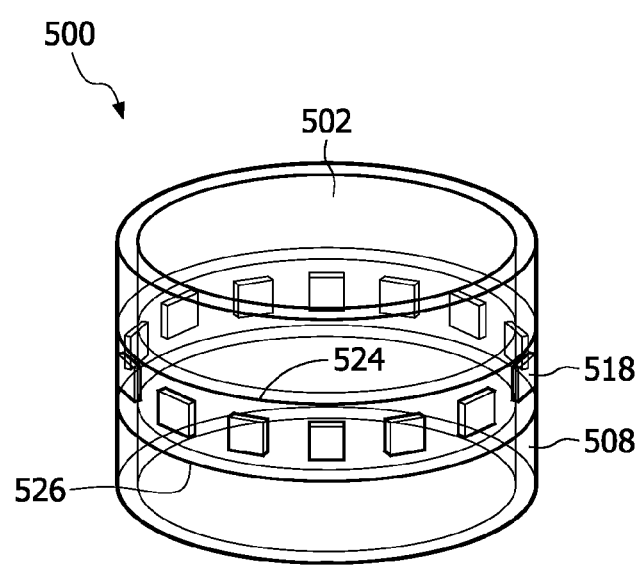
FIG. 20 shows a perspective view of another embodiment of the lighting device of the present invention, having circular light guides.

FIG. 20 shows luminaire 500, comprising light sources 518 that are arranged for emitting light into first circular light guide 502 and into second circular light guide 508. The light sources 518 are arranged in a circular fashion within the light guides. The light guides 502, 508 comprise dividing elements 524 and 526, respectively.

Figure 13:
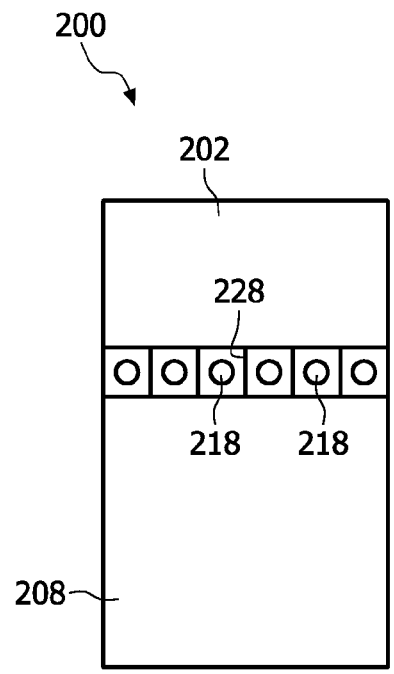
FIG. 13 shows a plan view of the lighting device of FIG. 12.
Figure 14:
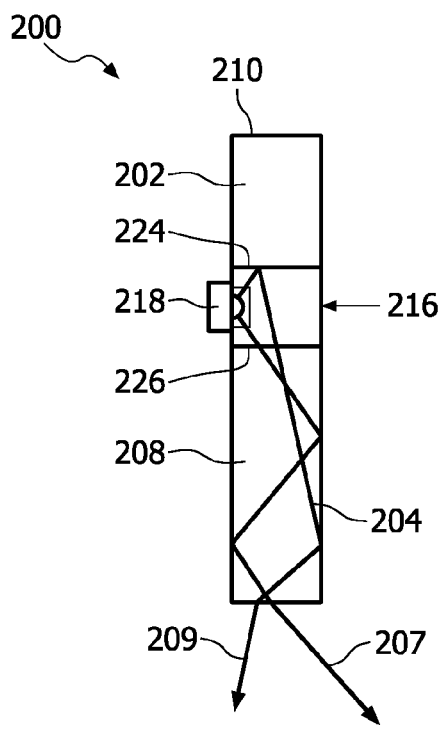
FIG. 14 shows a side view of the lighting device of FIG. 12 in a second state.

Basically, the luminaire 500 is a circular variant of the luminaire 200 shown in FIGS. 12-14. Circular variants of the lighting devices 1, 100, 300 and 400 are however likewise conceivable.

Figure 21:
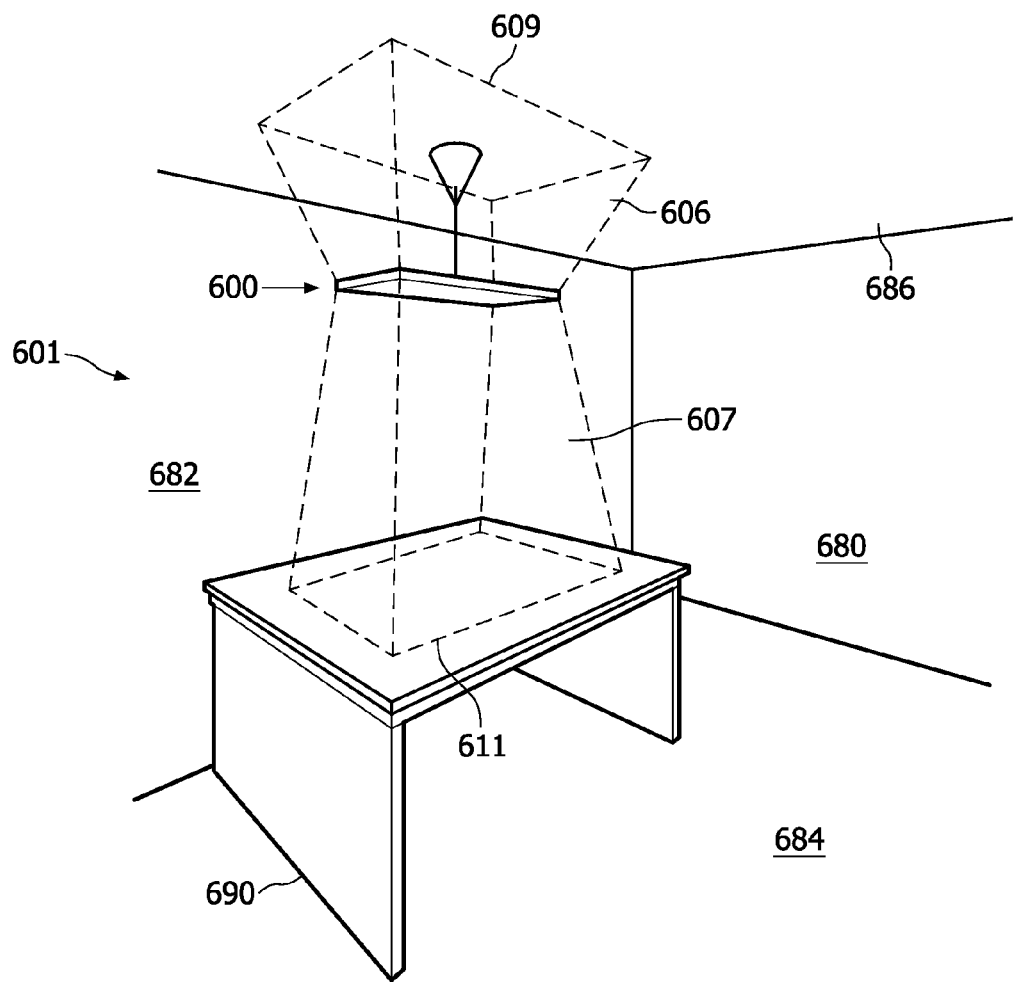
FIG. 21 shows a perspective view of a room provided with the lighting device of the present invention.

FIG. 21 shows a room 601 provided with a lighting device 600. The room 601 comprises sidewalls 680, 682, floor 684 and ceiling 686. Furniture including for instance table 690 is arranged at certain predetermined locations on the floor.

The lighting device 600 according to the present invention comprises a controller (not shown) for controlling the device. The lighting device 600 may output a first percentage of light in a first direction 606 and a second percentage of light in a second direction 607. The light 606 in the first direction arrives at area 609 of the ceiling 686, which acts as a reflecting surface. That is to say, the area 609 reflects the light 606 and scatters the light throughout the room 601. By decreasing the first percentage, the dividing means (see for instance FIG. 1) act as a dimmer. Due to the reflection, the scattering and/or the dimmer functionality, the light 606 in the first direction provides atmospheric lighting. The light 607 is directly directed downward, onto area 611 of table 690. The light 607 is suitable for lighting articles such as books, merchandise et cetera, and provides task lighting.

The first percentage and the second percentage can include any percentage between 0 and 100%, for instance 10%, 20%, 30% or 50%. As the lighting device outputs at most 100% of the light emitted by light sources 18, and taking into account possible losses within the lighting device, the sum of the first percentage and the second percentage will be about 100% or less. The lighting device according to the present invention may thus provide a first light output in the first direction and at the same time a second light output in another, second direction.

The present invention is not limited to the embodiments described above. Many modifications thereof are conceivable within the scope of the appended claims. Features of embodiments may for instance be combined. Also, instead of a two-way switch a three or more-way switch can be envisioned. Also two or more dividing structures according to the present invention may be provided in series, to provide three, four or even more directions to output the light from the light source. In other embodiments, the luminaire of the invention may include other optical elements, for instance to collimate or focus the light, and/or a collimator or a diffuser near the output end of the light guides. The first and second light guides may include any light guide that is suitable for guiding light from (LED) light sources. The light guides may include an air-filled channel having reflecting walls.

The invention claimed is:

1. A lighting device for simultaneously outputting light in two or more directions, the device comprising:
   a first light guide adapted to guide light and output the light in a first direction;
   a second light guide adapted to guide light and output the light in a second direction different from the first direction;
   a dividing structure adapted to receive light from a light source and guide the light into the first light guide and into the second light guide, the dividing structure comprising controllable dividing means for guiding a first portion of the light from the light source into the first light guide, and a second portion of the light from the light source into the second light guide.

2. The lighting device of claim 1, wherein:
   the first direction is adapted for providing uplighting; and
   the second direction is adapted for providing downlighting.

3. The lighting device of claim 1, comprising a reflecting surface that is arranged for reflecting the light output from the first light guide.

4. The lighting device of claim 1, wherein the first light guide and/or the second light guide comprise at least one flat panel light guide.

5. The lighting device of claim 4, wherein the first light guide and/or the second light guide comprise a stack of panel light guides.

6. The lighting device of claim 4, wherein the second light guide is arranged adjacent and parallel to the first light guide.

7. The lighting device of claim 1, wherein the light source comprises at least one LED.

8. The lighting device of claim 1, wherein the dividing structure comprises a controller that is connected to the dividing means for controlling the first percentage and the second percentage.

9. The lighting device of claim 1, wherein the dividing means comprise:
- a first stack for allowing the first percentage of light to pass into the first light guide;
- a second stack for allowing the second percentage of light to pass into the second light guide; at least one of the first stack and the second stack comprising:
- a first reflective polarizing layer;
- a control layer; and
- a second reflective polarizing layer.

10. The lighting device of claim 9, wherein the control layer comprises a ½-lambda layer.

11. The lighting device of claim 9, wherein the control layer comprises a liquid crystal layer.

12. The lighting device of claim 9, wherein the first stack and/or the second stack includes an additional ⅛-lambda layer, a ¼-lambda layer or a ½-lambda layer.

13. The lighting device of claim 1, wherein the dividing means comprise a slidable mirror assembly, comprising one or more mirrors for reflecting incident light; and one or more openings for allowing incident light to pass.

* * * * *